Aug. 12, 1958     S. M. CHRISTIAN     2,847,585
RADIATION RESPONSIVE VOLTAGE SOURCES
Filed Oct. 31, 1952
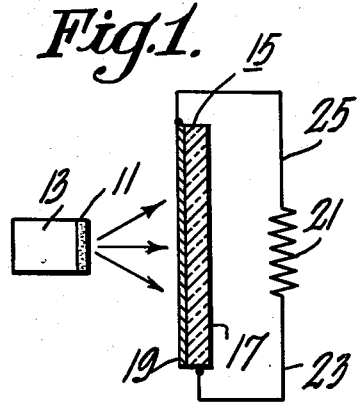
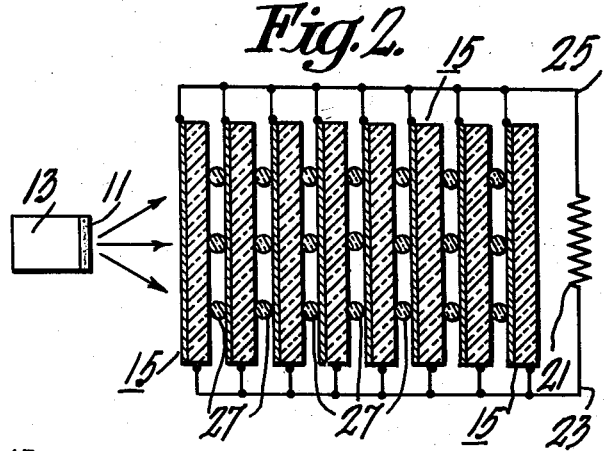
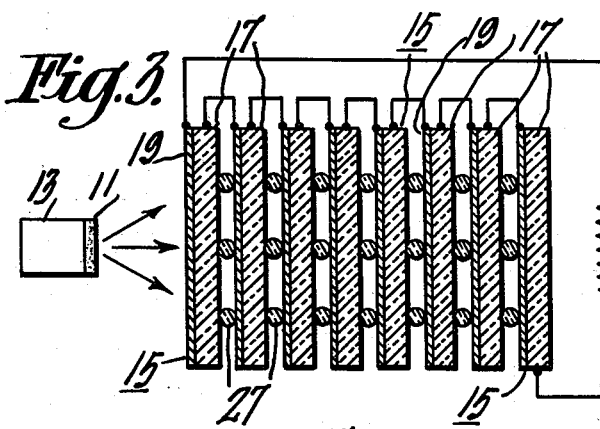
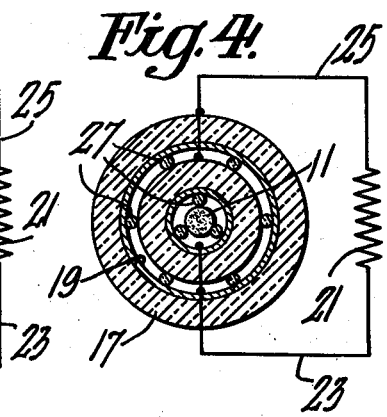
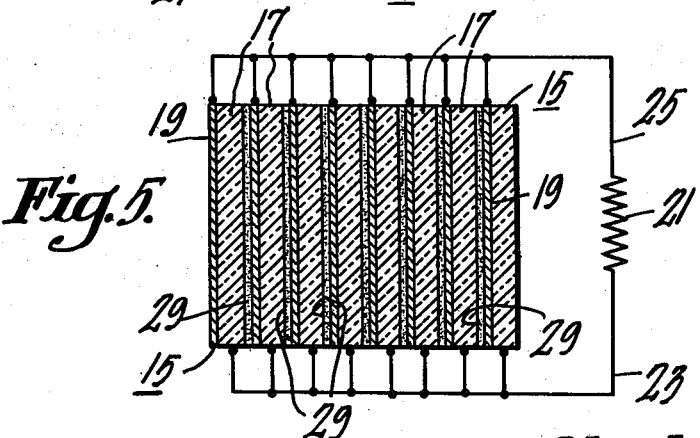
INVENTOR.
Schuyler M. Christian
BY J. L. Whittaker
ATTORNEY United States Patent Office 2,847,585
Patented Aug. 12, 1958

2,847,585

RADIATION RESPONSIVE VOLTAGE SOURCES

Schuyler M. Christian, Princeton, N. J., assignor to Radio Corporation of America, a corporation of Delaware Application October 31, 1952, Serial No. 318,003

15 Claims. (Cl. 310—3)

This invention relates generally to the generation of electrical energy. Particularly the invention directed to unique means for converting the energy of nuclear or other high energy radiations into electrical energy in usable form and apparatus fabricated as hereinafter set forth may be used to provide a primary source of electrical energy.

The enormous magnitudes of energy provided by certain nuclear radiations provide a tremendous field for the development of new sources of electrical energy. Some of these radiations comprise the emission of rays and/or particles having energies which vary from low values to several m. e. v. (millions of electron volts). For example, alpha ray emission comprises positively charged particles having energies varying from zero to the order of ten million electron volts, while beta ray emission comprises negatively charged particles having energies varying from a few thousand electron volts to the order of several million electron volts. Fast neutrons produced by means of a radium-beryllium reaction also have energies of the order of several million electron volts and the energy of gamma rays emitted by a radium source may be of the order of two million electron volts. It is desirable then that such energies be converted to usable electrical energy in a more convenient and efficient manner than in some systems heretofore proposed in which nuclear energy is converted to thermal energy, the thermal energy converted to mechanical energy, and the mechanical energy then converted to electrical energy.

Presently known apparatus, such as is described, for example, in E. G. Linder U. S. Patent 2,517,120, convert the energy of nuclear radiations into electrical energy by utilizing emmission and collection of high energy charged particles such as alpha and/or beta particles. In such arrangements only primary charged particles are collected and the apparatus does not permit the use of neutral emissions for voltage charging.

According to the instant invention neutral and/or charged particle high energy radiations may be utilized to achieve more efficient voltage charging. It his been found that when two different electrodes are brought into intimate contact with each other a potential barrier is established therebetween. Preferably one of the electrodes is a metal and the remaining electrode a semiconductor. Because of the surface state of the semiconductor, the potential barrier between the electrodes thus is enhanced. When the unit or barrier layer cell comprising these electrodes is subjected to high energy radiation a potential is established between the electrodes which may be utilized to supply energy and current to a load circuit. In theory, it is believed that for a given unit of entering high energy radiation many conduction electron-hole pairs are formed within each electrode. It is further believed that the conduction electrons which give rise to the electron voltaic effect resulting in the above voltage are those which travel in the potential depression zone of the potential barrier either by virtue of their being formed there or by diffusing there.

The principal object of the present invention is to provide improved means for generating electrical energy in response to high energy radiation.

Another object of the invention is to provide improved means for generating an electric potential in response to nuclear radiation.

Another object of the invention is to provide a more efficient means for converting the energy of high energy radiations into electrical energy.

A further object of the invention is to provide improved means for generating electrical energy in response to neutral high energy radiation.

A further object of the invention is to provide improved means for utilizing radioactive materials as sources of electrical energy.

A still further object of the invention is to utilize the electron voltaic effect in achieving voltage charging.

The invention will be described in greater detail with reference to the accompanying drawing in which:

Figure 1 is a schematic diagram of voltage charging apparatus, according to the invention;

Figure 2 is a schematic diagram of an embodiment of the invention wherein a plurality of the basic voltage charging units of Figure 1 are parallel-connected;

Figure 3 is a schematic diagram of a further embodiment of the invention in which a plurality of the basic voltage charging units of Figure 1 are serially-connected;

Figure 4 is a schematic diagram of a voltage source according to the invention, wherein cylindrical barrier layer cells are employed; and Figure 5 is a schematic diagram of a further voltage source, according to the invention, utilizing radioactive insulators between adjacent voltage charging units.

Similar reference characters are applied to similar elements throughout the drawings.

Referring to Figure 1, a cold source 11 of high energy radiation may be mounted upon some convenient support member 13. The particular type of radiation emitted by the source 11 may be either charged (alpha or beta particle) or neutral (gamma ray or neutron) emissions. For the purposes of the present description it will be assumed that either a gamma ray emitter such as cobalt$^{60}$ or a beta particle emitter such as strontium$^{90}$ is utilized.

The high energy radiation from the source 11 may be collimated if desired (by means not shown) to penetrate a barrier layer cell 15. The barrier layer cell 15 comprises a pair of electrically conductive electrodes 17 and 19 arranged such that one surface of electrode 17 is in intimate contact with one surface of electrode 19. Electrode 17 may be formed from a semiconductive element or compound such as germanium, silicon, selenium, zinc oxide or the like, while electrode 19 preferably comprises a low resistivity metal, for example, gold, rhodium, or platinum, which does not oxidize readily. It is pointed out however that the electrode 19 also may be semiconductive. In such case the electrode 19 should have a work function which is different from the work function of electrode 17. Although the contact mentioned above between the electrodes 17 and 19 may be achieved by physically "butting" the electrodes together, evaporation or electroplating of the metal onto the semi-conductor is preferred.

With the electrodes thus in contact a potential barrier or "potential depression" region is formed therebetween. As mentioned previously, it is believed that penetration of the cell 15 by a unit amount of source radiation causes many conduction electron-hole pairs in electrode 17. It appears that some of these conduction electrons are formed in the barrier region while others are formed further within the electrode materials and diffuse into the barrier region. The electrons which result in a voltage being developed between electrodes 17 and 19 thus is believed attributable to electric charges which travel in the potential depression zone of the potential barrier and cross the barrier to charge one of the electrodes to a potential which is negative with respect to the electrode in contact therewith. The electric energy of this potential may then be utilized to supply current to a load circuit 21 via conductors 23 and 25 joined respectively to electrodes 17 and 19.

Referring to Figures 2 and 3, further embodiments of the invention are shown wherein the range of penetration of the radiations emitted by the source 11 efficiently may be utilized. A plurality of the elemental charging units or barrier layer cells 15 described above are successively spaced from the source 11. The number of such cells which are employed preferably is equivalent to the range of the source radiations. To enable each cell to develop a separate voltage in response to penetration by the high energy source radiation and to prevent adjacent cells from effectively short-circuiting each other, an insulating medium 27 which is substantially permeable to the high energy radiation is disposed in contact with and intermediate the adjacent cells. The medium 27 may comprise, for example, spherical polystyrene spacers or a polystyrene mesh. With the barrier layer cells 15 thus stacked and insulated from each other, each cell develops an output which may be combined as desired with the voltages developed by other similar cells. In the event that a relatively efficient power transfer to the load circuit 21 is desired, the cells may be parallel connected as shown in Figure 2. With this arrangement the terminal voltage developed by the device is equal to the voltage developed by a single cell and the current supplied to the load circuit 21 is a function of the number of barrier layer cells employed. An important advantage of this embodiment is that the effective internal impedance of the device is appreciably reduced. Alternatively the cells may be serially connected as shown in Figure 3, each unit voltage developed by a given cell being added to voltages developed by other cells. Thus, within limits imposed by the range of the high energy radiation, a relatively high terminal voltage may be obtained.

In Fig. 4 an embodiment of the invention is illustrated wherein the barrier layer cells 15 are spaced from and surround the radiation source 11. This cylindrical form of voltage source may be desirable for several reasons. One such reason is that the high energy radiation material which normally comprises a health hazard is located in the center of the device. By using a sufficient number of cylindrical barrier layer cells 15 concentrically aranged about the source, the number of which is determined by the penetration power of the high energy radiation, substantially all the energy of the high energy radiation is expended in penetrating the cells and substantially no damaging radiation escapes from the device. Moreover, since the cells surround the source 11 substantially all the particles or rays emitted thereby are effective in voltage charging. This configuration thus is more efficient than configurations employing planar sources or films of radioactive materials wherein a portion of the emitted radiation is not directed toward the cells and is effectively lost. While the present embodiment shows the cells 15 parallel-connected, they also may be connected in series.

Referring to Figure 5 a further embodiment of the invention is shown which is similar in part to the embodiments described with reference to Figures 2 and 3. In this instance, however, the high energy radiation source 11 has been omitted and the insulating spacers 27 have been replaced by a plurality of radioactive insulators 29. The radioactive insulator material employed, by way of example, may comprise alpha particle emitters such as polonium oxide, uranium oxide, polonium powder mixed in polystyrene, or may comprise beta particle emitters such as strontium oxide or radioactive carbon ($C^{14}$) in polystyrene. These materials provide insulation between adjacent barrier layer cells and also are effective as sources of high energy radiations. In devices of this type the radiation material more efficiently may be utilized by disposing it between each of the cells providing voltage charging than by concentrating a relatively large amount of radioactive material at a single location.

What is claimed is:

1. Apparatus for generating electrical energy comprising, in combination, a first solid electrode, a second electrode of a material different from said first electrode comprising a solid semiconductor having a surface in contact with a surface of said first electrode whereby a potential barrier is formed between said electrodes, a radioactive source for providing high energy radiations for penetrating said electrodes to produce electric charges which cross said barrier to develop an electric potential between said electrodes, and means for deriving a load current in response to said potential.

2. Apparatus as claimed in claim 1 wherein said radioactive source comprises a source for providing neutral radiations.

3. Apparatus as claimed in claim 1 wherein said high energy radiation source comprises a source for providing charged particle radiations.

4. Apparatus as claimed in claim 1 wherein said first electrode is a metal.

5. Apparatus as claimed in claim 1 wherein said first electrode comprises a semiconductor.

6. Apparatus for generating electrical energy comprising, in combination, a plurality of cold sources for providing high energy radiations, a plurality of barrier layer cells interspersed between said sources and responsive to said radiations for developing separate electric potentials, said cells each including a first solid conductive electrode and a second electrode different from said first electrode comprising a solid semiconductor, and means for combining said potentials for deriving a load current.

7. Apparatus as claimed in claim 6 wherein said high energy radiation sources are in contact with and insulate adjacent barrier layer cells.

8. A primary source of electrical energy comprising, a semiconductive device exhibiting an electron-voltaic effect, means for irradiating said semiconductive device with nuclear emissions to generate an electric potential, and connection means to said device for utilizing said potential to supply a load current.

9. A primary source of electrical energy comprising, a semiconductive device, means for irradiating said semiconductive device with nuclear emissions to liberate charge carriers within said device to produce an electric potential, and connection means to said device for utilizing said potential to derive an electric current.

10. A primary source of electrical energy comprising, a semiconductive device, means for irradiating said semiconductive device with neutral radioactive high energy emissions to liberate charge carriers within said device to produce an electric potential, and connection means to said device for utilizing said potential to derive an electric current.

11. A primary source of electrical energy comprising, a semiconductive device, means for irradiating said semiconductive device with radioactive charged particle emissions to liberate charge carriers within said device to produce an electric potential, and connection means to said device for utilizing said potential to derive an electric current.

12. A primary source of electrical energy comprising, a semiconductive device, a source of nuclear emissions for irradiating said semiconductive device to generate an electric potential, and connection means to said device for utilizing said potential to derive a load current.

13. A primary source of electrical energy comprising, a junction of two solid materials including a potential barrier therebetween, a source of nuclear emission positioned to irradiate at least one of said solid materials to generate an electric potential, and connection means to said materials for utilizing said potential to derive a load current.

14. A primary source of electrical energy as claimed in claim 13 wherein one of said materials is a semiconductor and the other of said materials is a metal plated on said semiconductor.

15. A primary source of electrical energy comprising, a source of nuclear emissions, a semiconductive device positioned in the path of said nuclear emission for producing an electrical current substantially greater than the equivalent electrical current of said nuclear emissions incident on said device, and connection means to said semiconductive device for deriving said greater current.

References Cited in the file of this patent

UNITED STATES PATENTS

| | | |
|---|---|---|
| 2,034,334 | Falkenthal | Mar. 17, 1936 |
| 2,527,945 | Linder | Oct. 31, 1950 |
| 2,543,039 | McKay | Feb. 27, 1951 |
| 2,547,173 | Rittner | Apr. 3, 1951 |
| 2,661,431 | Linder | Dec. 1, 1953 |

OTHER REFERENCES

Nuclear Electrostatic Generator, Linder, The Physical Review, vol. 71, No. 2, January 15, 1947, pp. 129–130.

The Electrician, October 31, 1924, page 497.